(No Model.) 2 Sheets—Sheet 1.

H. J. HANDWERCK.
Apparatus for Cooling Beer, &c.

No. 236,945. Patented Jan. 25, 1881.

(No Model.) 2 Sheets—Sheet 2.

H. J. HANDWERCK.
Apparatus for Cooling Beer, &c.

No. 236,945.          Patented Jan. 25, 1881.

UNITED STATES PATENT OFFICE.

HUGO JAECKEL HANDWERCK, OF GRIMMA, SAXONY, GERMANY.

APPARATUS FOR COOLING BEER, &c.

SPECIFICATION forming part of Letters Patent No. 236,945, dated January 25, 1881.

Application filed December 13, 1880. (No model.)

*To all whom it may concern:*

Be it known that I, HUGO JAECKEL HANDWERCK, of Grimma, Kingdom of Saxony, German Empire, have made an Improvement in Apparatus for Cooling Beer, Worts, and other Liquids, of which the following is a specification.

In order to avoid the noxious influences to which beer, wort, or other hot liquids to be cooled are more or less exposed on cooling-vessels, especially during the warm season, it is highly necessary to cool the beer, wort, or other liquids with as little delay as possible. For this purpose I have constructed an isolated tower—that is to say, not in connection with any other edifice—for cooling, arranged with the cooling-vessels in stories, and these vessels provided with external circulation of water, and with ventilating devices, by which means a larger quantity of hot beer-wort can be cooled within a shorter space of time than has been effected heretofore. Above each cooling-vessel I arrange large wind blowers or fans, by the rotation of which I cause the vapors to escape quickly, and thereby to accelerate evaporation. By the large draft of air created by these fans any injurious ferments are prevented from depositing on the surface of the wort. I construct the cooling-vessels with false or double bottoms, so that a space of about one inch to one and a half is provided between such false bottom and the bottom of the cooling-vessel. Within this space I cause cold water to circulate, if necessary, by the influence of which the cooling is accelerated. The water may be led there by any high-pressure water-pipe, or may be pumped there, and may be carried away by an overflow-tube.

Figure 1:
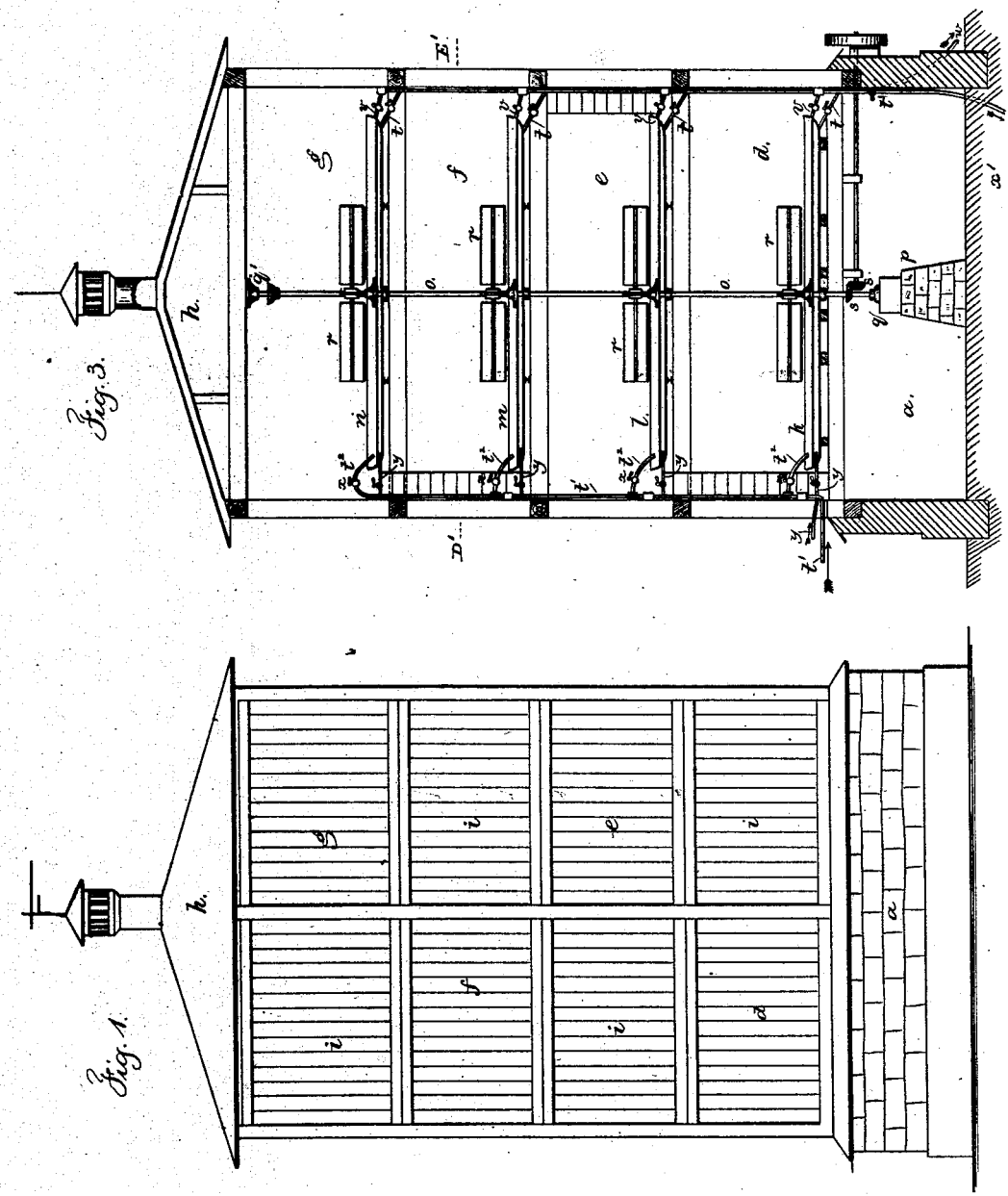
Figure 2:
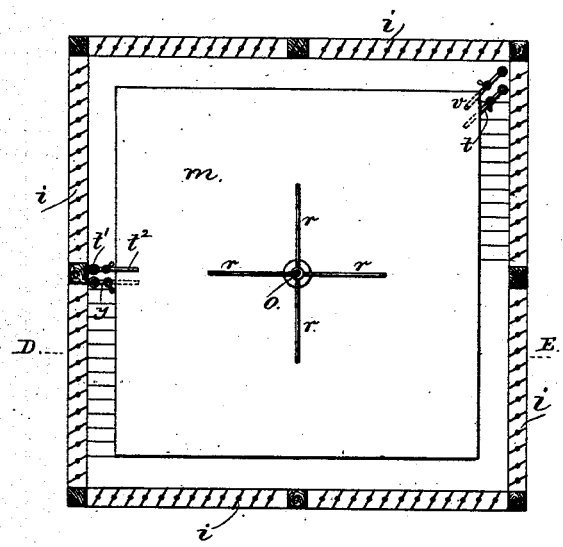

In the drawings, Figure 1 is an external view of the cooling-tower. Fig. 2 is a sectional plan view of the tower at the line D′ E′, and Fig. 3 is a vertical section at the line D E.

I construct the tower with a basement, which is elevated above the level of the ground for about six to seven feet. This basement may be of a rectangular form, as shown in the drawings; but I do not limit myself to the dimensions hereinbefore or hereinafter named, nor to this special rectangular form of the tower or of the vessels contained therein, as these parts may be round, oval, or of any convenient form. Upon such basement I erect a scaffolding or framing, preferably of wood, which carries on its upper portion a roof, $h$, provided with a chimney-ventilator for carrying off any vapor which collects underneath the roof. This wooden part of the tower is divided into any desired number of stories. I have shown four, and I generally prefer to divide the tower into so many stories as I intend to erect cooling-vessels within such tower. Each story is provided on the four sides with Venetian blinds or shutters $i$, so that by partly or entirely opening the shutters the air may have access from the different sides into the tower. I have shown these Venetian blinds placed vertically for the easy management of each set of these blinds; but they may also be placed in horizontal position.

In Fig. 3 the arrangement of the cooling-vessels $k\ l\ m\ n$, one on each story $d\ e\ f\ g$, is shown, these vessels being each provided with a false bottom, into which cold water is admitted by pipe $y$, which water, after having accomplished its cooling service, is carried off by pipes $t$. The vessels $l\ m\ n$ may be preferably mounted or resting on supports of I-iron, which rest on the wooden beams constituting the stories, whereas the vessel $k$ may be mounted on wooden beams entirely.

A vertical shaft, $o$, passes through all the cooling-vessels. This shaft rests in a step-bearing, $q$, which is mounted on suitable pillar $p$ within the basement of the tower. The upper end of the shaft turns in a bearing, $q'$, fastened to the roof-work of the tower. Underneath this bearing $q'$ a screen or suitable vessel is fixed, so as to prevent any lubricating material from bearing $q'$ running down the shaft into the wort on the upper vessel, $n$.

Above each cooling-vessel a fan or wind-blowing device, $r$, is fixed to the shaft. I prefer to make the blades of these fans of sheet-iron, and to adjust the situation of the fans in such way that the lower edge of these blades is in line, or nearly so, with the upper rim or edge of the cooling-vessel.

The rotary motion of the shaft with its fans is derived from suitable miter-wheels or friction-wheels $s\ s$, one of which is keyed upon shaft $o$, the other on the horizontal shaft which is prolongated through the walls of the basement and mounted in suitable bearings, the outer end being provided with a pulley or rope-wheel, or other suitable device, to receive rotary motion from any prime motor. I prefer to cause the vertical shaft to rotate two hundred revolutions per minute. The hot wort enters the tower by a pipe at $t'$, and ascends and flows off through branch pipes $t^2$ into the cooling-vessel, filling them to the proper height. In order that the supply may be excluded from either vessel, I provide a cock or valve, $x$, in each branch pipe leading from the upright pipe to the vessels. The water for cleaning the vessels after they have been used may enter through the same pipe and branch pipes. The cooled wort is drawn off at $r$ by suitable taps or valves, and is led, by suitable tubes, into the fermentation-cellar at $x'$. This tube may also serve to carry off that thick part of the wort which deposits on the vessels, and from which the bright wort is first drawn off. This tube may further serve to carry off any waste-water from the vessels; but I prefer to arrange a suitable cock or valve at $t^3$, to direct such waste-water in the direction of the arrow $w$, which leads into a suitable sewer.

In order to give access to all the cocks or valves and bearings mentioned, and to clean the vessels, proper stairs are arranged from the basement to all the different stories. A door is made at any convenient spot in the wall of the basement $a$.

In Fig. 2 the vessel $m$ is shown. In the middle of each vessel is a suitable box riveted to the bottom, through which box the vertical spindle $o$ passes. The rim of this box is elevated above the rim of the cooling-vessel. Around the vessels I provide a walk formed of boards, so as to have access to all sets of Venetian blinds on all sides of the tower.

By the described arrangements I am enabled to cool down any liquid in the vessels within a short period, as the fans will move all vapors, and will thereby accelerate evaporation, while the cooling-water in the false bottom will contribute to the quick cooling of the liquid.

Having now described my invention, I wish it to be understood that I do not claim a cooling-vessel provided with proper tubes, cocks, or vessels, and with fans or blowers for the purpose mentioned.

I claim as my invention—

In an apparatus for cooling worts, beer, and other liquids, a series of shallow cooling-vessels placed one above the other, and each provided with a false bottom, in combination with pipes and cocks for supplying the liquid to be cooled and the water for cooling, a tower for sustaining the shallow vessels and its inclosing-blinds, a vertical shaft with fans adjacent to the surface of the liquid to be cooled, and means for revolving such shaft and fans, substantially as and for the purposes set forth.

In testimony whereof I have hereunto set my hand this 7th day of November, 1880, in the presence of two subscribing witnesses.

HUGO JAECKEL HANDWERCK.

Witnesses:
JULIUS LAUINGER,
JACQUES EHRENHAUR.